United States Patent [19]

Truskalo

[11] Patent Number: 4,516,169

[45] Date of Patent: May 7, 1985

[54] SYNCHRONIZED SWITCHING REGULATOR FOR A MULTIPLE SCANNING FREQUENCY VIDEO MONITOR

[75] Inventor: Walter Truskalo, Titusville, N.J.

[73] Assignee: RCA Corporation, Princeton, N.J.

[21] Appl. No.: 498,767

[22] Filed: May 27, 1983

[51] Int. Cl.³ .............................................. H04N 3/18
[52] U.S. Cl. .................................................... 358/190
[58] Field of Search .................. 358/190; 315/411, 408

[56]  References Cited
U.S. PATENT DOCUMENTS 4,368,409  1/1983  Sivanesan et al. ................... 358/190

*Primary Examiner*—John C. Martin
*Assistant Examiner*—Howard Carter
*Attorney, Agent, or Firm*—Eugene M. Whitacre; Paul J. Rasmussen; Joseph J. Laks

[57]  ABSTRACT

In a video display monitor having a multiple rate scanning capability, a synchronized switching power supply develops the regulated operating voltages for the monitor. A deflection circuit produces scanning current in a deflection winding and is capable of being operated at either one of two selectable scanning frequencies. A signal synchronously related to the scanning current, such as a retrace pulse voltage, is applied to the control circuit of the switching power supply. The control circuit generates a control signal from the retrace pulse voltage that is synchronously related to the scanning current and of a frequency that is unchanged when the deflection circuit is operated at either of the two selectable scanning frequencies. The output stage of the switching power supply responds to the control signal and produces switching operation at the unchanged frequency in synchronism with the scanning current.

8 Claims, 7 Drawing Figures

SYNCHRONIZED SWITCHING REGULATOR FOR A MULTIPLE SCANNING FREQUENCY VIDEO MONITOR

This invention relates to switching power supplies for display systems having multiple rate scanning systems.

In a video monitor where picture information is displayed on the monitor screen by means of raster scanning, it may be desirable for the scanning system to be capable of operation at more than one scanning frequency, such as at a 1H scanning frequency of 15.75 kilohertz in the NTSC system, and at a 2H scanning frequency of 31.5 kilohertz. The 2H operation may be desirable to provide improved picture resolution, such as when a high resolution picture tube is used that is capable of displaying the picture information in one thousand or more horizontal raster lines.

A switching power supply may be incorporated in the 1H–2H monitor to provide regulated operating voltages therefor. Synchronized operation of the switching components in the power supply may be desirable in order to avoid pick-up in the video channel of switching transients during the active portion of a line interval.

In multiple rate scanning video monitors, it is known to operate switching power supplies at the same frequency as that at which the scanning system is operated. Such an arrangement, however, introduces added complexity into the control circuitry of the switching power supply. The control circuitry must accept synchronizing signals of various frequencies developed by the scanning system. The output stages and the power transformer must also be designed to function properly at different frequencies.

A feature of the invention is a switching power supply for a display system having a multiple rate scanning capability. The power supply does not require switching operation at more than one frequency, but is, nevertheless, synchronized with scanning operation. A deflection circuit produces scanning current in a deflection winding and is capable of being operated at either one of two selectable scanning frequencies. A synchronizing signal synchronously related to the scanning current is applied to a control circuit of the power supply. The control circuit generates a control signal that is synchronously related to the scanning current and of a frequency that is unchanged when the deflection circuit is operated at either of the two scanning frequencies. The control signal is applied to the switching stages of the power supply to produce switching operation at the unchanged frequency in synchronism with the scanning current.

Figure 1:
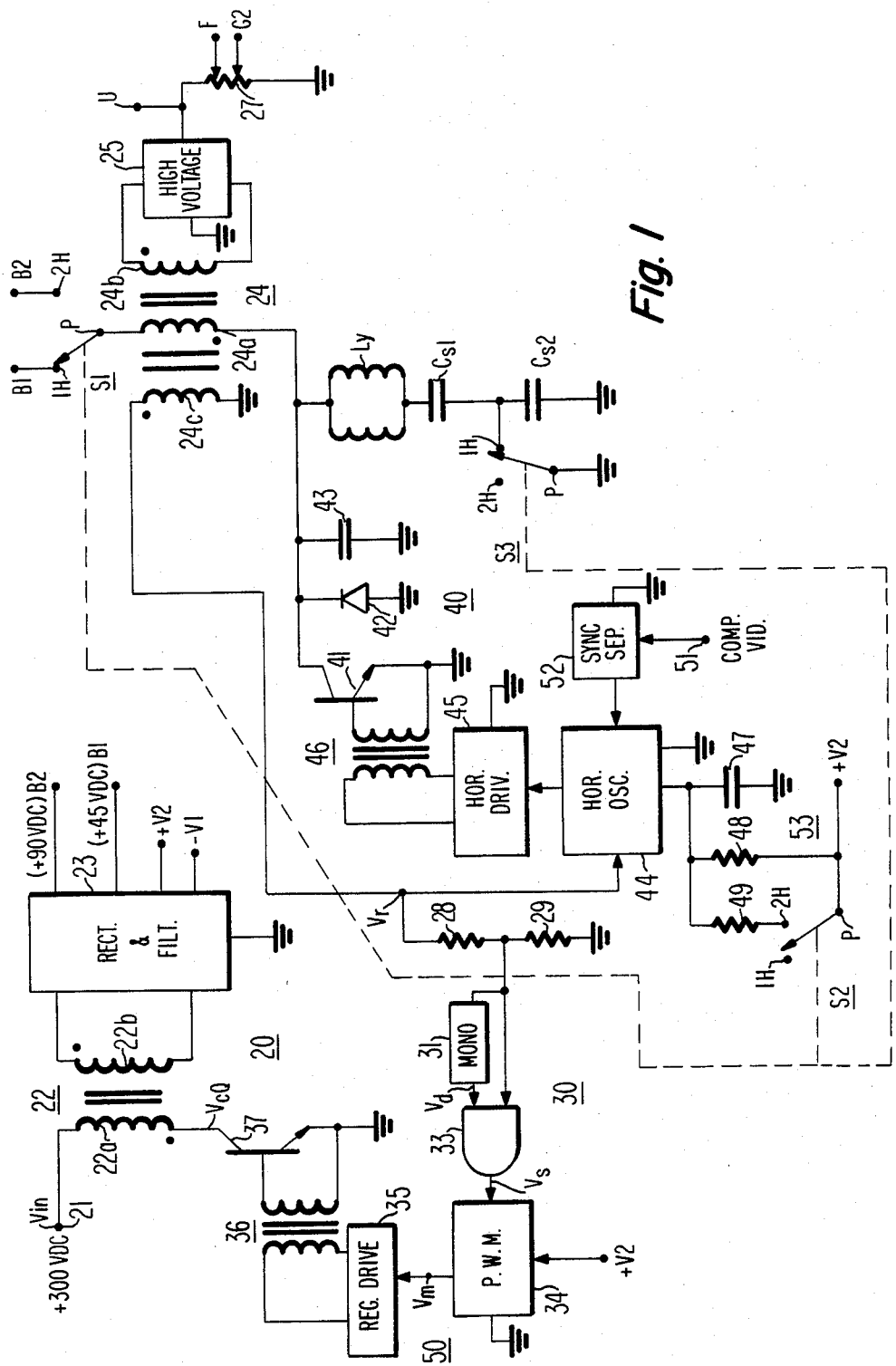
FIG. 1 illustrates a multiple rate scanning system in a display system, including a synchronized switching power supply embodying the invention.

In the power supply and deflection circuit, illustrated in FIG. 1, an unregulated DC input voltage $V_{in}$, developed at a terminal 21, is applied to a primary winding 22a of a power transformer 22 of a switching power supply 20. Primary winding 22a is coupled to a power switching transistor 37. In response to a switching control signal $V_m$ developed by a regulator control circuit 50 and coupled to the base of switching transistor 37 by way of a driver circuit 35 and a coupling transformer 36, the switching of transistor 37 is pulse width modulated to produce a pulse width modulated alternating voltage across a secondary winding 22b of transformer 22. A rectifier and filter circuit 23 coupled to winding 22b develops regulated DC operating or supply voltages B2, B1, $+V2$ and $-V1$. The B2 and B1 supply voltages are both positive voltages, with the B2 voltage being of greater magnitude.

The B2 and B1 supply voltages serve as B+ scan supply voltages for a multiple scanning rate horizontal deflection circuit 40. Horizontal deflection circuit 40 is capable of being operated at different, selectable horizontal scanning frequencies. When ganged, single-pole, double-throw switches S1, S2 and S3 are switched into the positions illustrated in FIG. 1, deflection circuit 40 is operated at the 1H scanning rate. When switches S1 through S3 are switched into the other positions, where the pole terminal of each switch is connected to the 2H terminal, deflection circuit 40 is operated at the higher, double frequency scanning rate of 2H.

Terminal P of switch S1 is coupled to one terminal of a primary winding 24a of a flyback transformer 24. The other terminal of primary winding 24a is coupled to the horizontal deflection winding $L_y$ of horizontal deflection circuit 40. Horizontal deflection circuit 40 includes an output stage that comprises a horizontal output transistor 41, a damper diode 42, a retrace capacitor 43 and the series arrangement of horizontal deflection winding $L_y$ with S-shaping capacitors $C_{s1}$ and $C_{s2}$. The junction between the two S-shaping capacitors is coupled to the 1H terminal of switch S3. The other terminal of capacitor $C_{s2}$ is grounded, as is the pole terminal P of switch S3.

The switching of output transistor 41 to generate scanning current in horizontal deflection winding $L_y$ is controlled by signals developed by a horizontal oscillator 44 and coupled to the base of output transistor 41 through a horizontal driver stage 45 and a coupling transformer 46.

To synchronize horizontal scanning operation with the video content of a composite video signal developed at a terminal 51, horizontal oscillator 44 is operated at the same frequency as that of the horizontal synchronizing pulses contained within the composite video signal and in proper phase alignment therewith to enable the center of the active video portion of each horizontal line to occur substantially in the center of the horizontal scan or in some other desired phase relationship therewith. The composite video signal may be derived from any one of a number of sources, such as a broadcast source, a computer terminal, a video disc player or a video tape recorder.

Assume the composite video signals being developed at terminal 51 includes synchronizing pulses that are repeating at the 1H, 15.75 kilohertz rate. The operator of the monitor throws switches S1 through S3 into their 1H position, as illustrated in FIG. 1.

The frequency of horizontal oscillator 44 is determined by the RC time constant associated with an RC network 53, comprising capacitor 47 and resistors 48 and 49. With switch S2 in the position illustrated in FIG. 1 for 1 H operation, resistor 49 is disconnected from the remaining portion of the RC network. The RC time constant of network 53 is therefore lengthened to produce the lower frequency, 1H operation of horizontal oscillator 44. With horizontal output transistor 41 being switched at a 1H rate, the scanning current is generated in horizontal deflection winding $L_y$ at a 1H rate. The synchronization of horizontal oscillator 44 with the picture content of the composite video signal is accomplished in a conventional manner in the automatic frequency and phase control portion of the oscillator by comparing retrace pulses developed by flyback transformer secondary winding 24c with horizontal sync pulses developed by a sync separator 52.

With switch S1 in the 1H position as illustrated, the lower B1 scan supply voltage is supplied to horizontal deflection circuit 40 to generate the required peak amplitude scanning current at the end of the retrace interval to enable the electron beams to be deflected to its extreme position on the screen of the picture tube. Also, with switch S3 in the 1H position as illustrated, capacitor $C_{s2}$ is bypassed, and the S-shaping capacitance of horizontal deflection circuit 40 is effectively only that of capacitor $C_{s1}$, thereby producing the proper S-waveshaping of the scanning current at 15.75 kilohertz operation.

When horizontal output transistor 41 becomes cut off, retrace capacitor 43 and deflection winding $L_y$ form a resonant retrace circuit to retrace the electron beam to its start to scan position. The retrace pulse voltage developed across retrace capacitor 43 is applied to primary winding 24a of flyback transformer 24, stepped up by a high voltage winding 24b and rectified and filtered by a high voltage circuit 25 to develop an ultor accelerating potential at a terminal U for the picture tube, not illustrated in FIG. 1, of the video monitor. Focus and screen electrode supply voltages are developed at the respective wiper arms of a resistor 27 coupled to terminal U.

The retrace pulse voltage $V_r$ developed across flyback transformer secondary winding 24c is also used to synchronize the switching operation of power supply 20. With switches S1 through S3 in their 1H positions the retrace pulse voltage $V_r$ repeates at the 1H rate, as schematically illustrated in the waveform of FIG. 2a.

The retrace pulse voltage $V_r$ is divided by a voltage divider comprising resistors 28 and 29 and applied as an input signal to an AND gate 33 and as an input signal to a monostable, one-shot 31, of a pulse conditioning circuit 30. The output of monostable 31 illustrated by the voltage $V_d$ is applied as another input signal to AND gate 33.

Monostable 31 operates in the following manner. The trailing or negative going edge of the retrace pulse voltage $V_r$ of FIG. 2a triggers monostable 31 into its unstable state. As illustrated in FIG. 2d, in the unstable state, the output $V_d$ of the monostable is low, disabling AND gate 33. The output $V_s$ of AND gate 33, illustrated in FIG. 2e, goes low at the trailing edge of the retrace pulse voltage $V_r$ of FIG. 2a. The duration, $\Delta t$, of the unstable state of monostable 31 is selected to be greater than the 2H scanning horizontal deflection interval of 31.75 microsecond but substantially less than the 1H scanning horizontal deflection interval of 63.5 microsecond.

Figure 2:
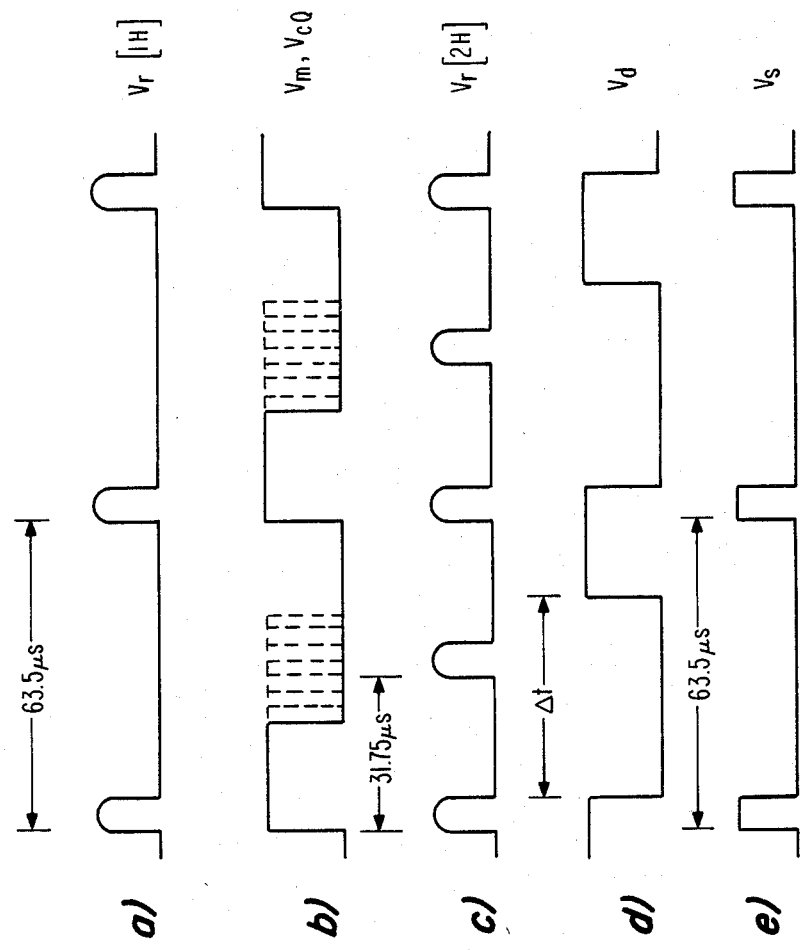
FIG. 2 illustrates waveforms associated with the operation of the circuit of FIG. 1.

With such a selection for the duration $\Delta t$ of the unstable state of monostable 31, the monostable returns to its stable, high state prior to the occurrence of the next subsequent 1H retrace pulse voltage $V_r$, as one notes by comparing FIGS. 2a and 2d. AND gate 33 becomes enabled within each interval of the 1H horizontal deflection cycle, somewhat prior to the occurrence of the horizontal retrace pulse voltage $V_r$ of FIG. 2a. With AND gate 33 enabled prior to the occurrence of each 1H horizontal retrace pulse voltage and disabled with the trailing edge of the horizontal retrace pulse voltage, pulse conditioning circuit 30 reconstitutes the horizontal retrace pulse voltage $V_r$ in the form of the regulator synchronizing pulse voltage $V_s$ of FIG. 2e. The pulse $V_s$ is coincident with the occurrence of each retrace pulse voltage $V_r$.

Regulator sync pulse $V_s$ is applied to pulse width modulator 34 of regulator control circuit 50 for synchronizing the switching of regulator output transistor 37. Upon receipt of the leading edge of regulator sync pulse $V_s$, the pulse width modulator control voltage $V_m$, illustrated in FIG. 2b, is switched to the high state. When voltage $V_m$ goes high, switching transistor 37 is turned off shortly thereafter depending upon the turn-off delay of the transistor. This result is illustrated in FIG. 2b, which also schematically illustrates the collector voltage $V_{cQ}$ of transistor 37. Thus, the turn-off of switching transistor 37 occurs within the horizontal retrace interval, as noted by inspection of FIGS. 2a and 2b. Video transients induced by the turn-off of transistor 37 therefore occur during the horizontal retrace interval, reducing visual disturbances of the picture.

To regulate the supply voltages of power supply 20, one of the supply voltages, voltage $+V2$, is fed back to pulse width modulator 34 to vary the negative going trailing edge of control voltage $V_m$, as illustrated by the dashed lined portions of the waveform of FIG. 2b.

When the source of composite video signals developed at terminal 51 generates horizontal sync at a 2H rate, switches S1 through S3 are thrown into their 2H position. The time constant of RC network 53 is shortened, enabling horizontal oscillator 44 to operate at the 2H frequency. Scanning current in horizontal deflection winding $L_y$ is generated at the 2H frequency. The S-shaping capacitor $C_{s2}$ is switched in-circuit with capacitor $C_{s1}$, decreasing the total S-shaping capacitance to provide the proper waveshaping of the horizontal scanning current at the higher, 2H frequency.

Switch S1, now in the 2H position, applies the higher, B+ scanning voltage of the B2 supply to horizontal deflection circuit 40. In the 2H mode of operation, the duration of the horizontal trace interval is approximately one half that of the horizontal trace interval for 1H mode of operation. The horizontal scanning current, however, remains substantially unchanged because the B+ scanning voltage has been increased accordingly.

The retrace capacitance is the same for both 1H and 2H modes of operation and is that of the capacitance of retrace capacitor 43. The peak retrace pulse voltage developed during horizontal retrace is therefore the same for both 1H and 2H modes of operation. The ultor accelerating potential developed at terminal U remains substantially unchanged in both modes of operation.

The retrace pulse duration, as well as the retrace pulse amplitude, remains substantially unchanged for 2H mode of operation. To avoid unduly shortening the duration of the active video portion of each horizontal line in 2H mode of operation, the values of retrace capacitor 43 and horizontal deflection winding $L_y$ are chosen to produce a retrace interval of approximately six microseconds, for both 1H and 2H modes of operation.

The 1H–2H switching functions of switches S1–S3 may be advantageously performed using a semiconductor switching arrangement described in U.S. patent application Ser. No. RCA 79,617, by W. F. Wedam, W.

E. Babcock and J. M. Schmoke, Jr., entitled "A POWER SUPPLY AND DEFLECTION CIRCUIT PROVIDING MULTIPLE SCAN RATES", herein incorporated by reference. Furthermore, as referenced in the just mentioned U.S. patent application, to maintain a constant raster width during both 1H and 2H operation, flyback transformer primary winding 24a is provided with an intermediate tap terminal, not illustrated in FIG. 1, and switch S1 is changed to be, in effect, a double-pole, double-throw switch. One pole of the switch is connected to the end terminal of primary winding 24a as shown in FIG. 1, and its associated 1H contact terminal connected to the B1 supply. The other pole is connected to the tap terminal of primary winding 24a, and its associated 2H contact terminal connected to the B2 supply.

With switches S1-S3 in the positions for 2H mode of operation, the retrace pulse voltage $V_r$ used for synchronizing the operation of switching power supply 20 repeats at the 2H rate or every 31.75 microsecond as illustrated by the 2H rate voltage $V_r$ of FIG. 2c.

Pulse conditioning circuit 30 operates on the 2H rate retrace pulse $V_r$ to delete alternating pulses and produce a regulator synchronizing signal $V_s$ unchanged in frequency from those produced during 1H operation. FIG. 2e, therefore, illustrates the regulator synchronizing pulses being applied to pulse width modulator 34 during both 1H and 2H modes of operation. Synchronization of the turning off of the transistor 37 during the development of a horizontal retrace pulse interval is still obtained in the 2H mode, with its ensuing advantage, as may be noted from inspection of FIGS. 2b, 2c and 2e. Furthermore, the design of regulator control circuit 50 is not complicated by the additional requirement of synchronization at more than one frequency, because only single frequency pulses $V_s$ are being applied to the regulator control circuit, even in 2H mode of operation.

Pulse conditioning circuit 30 accomplishes its pulse deletion function in the 2H mode of operation by means of the proper selection of the duration Δt of the low, unstable state of the output $V_d$ of monostable 31. As previously mentioned, the duration Δt is selected to be greater than the horizontal deflection interval of 31.75 microseconds at the 2H rate. Thus, as noted in comparing FIGS. 2c and 2d, every other horizontal retrace pulse occurs when AND gate 33 is disabled by monostable 31 and is unable to be passed through the AND gate to pulse width modulator 34.

Figure 3:
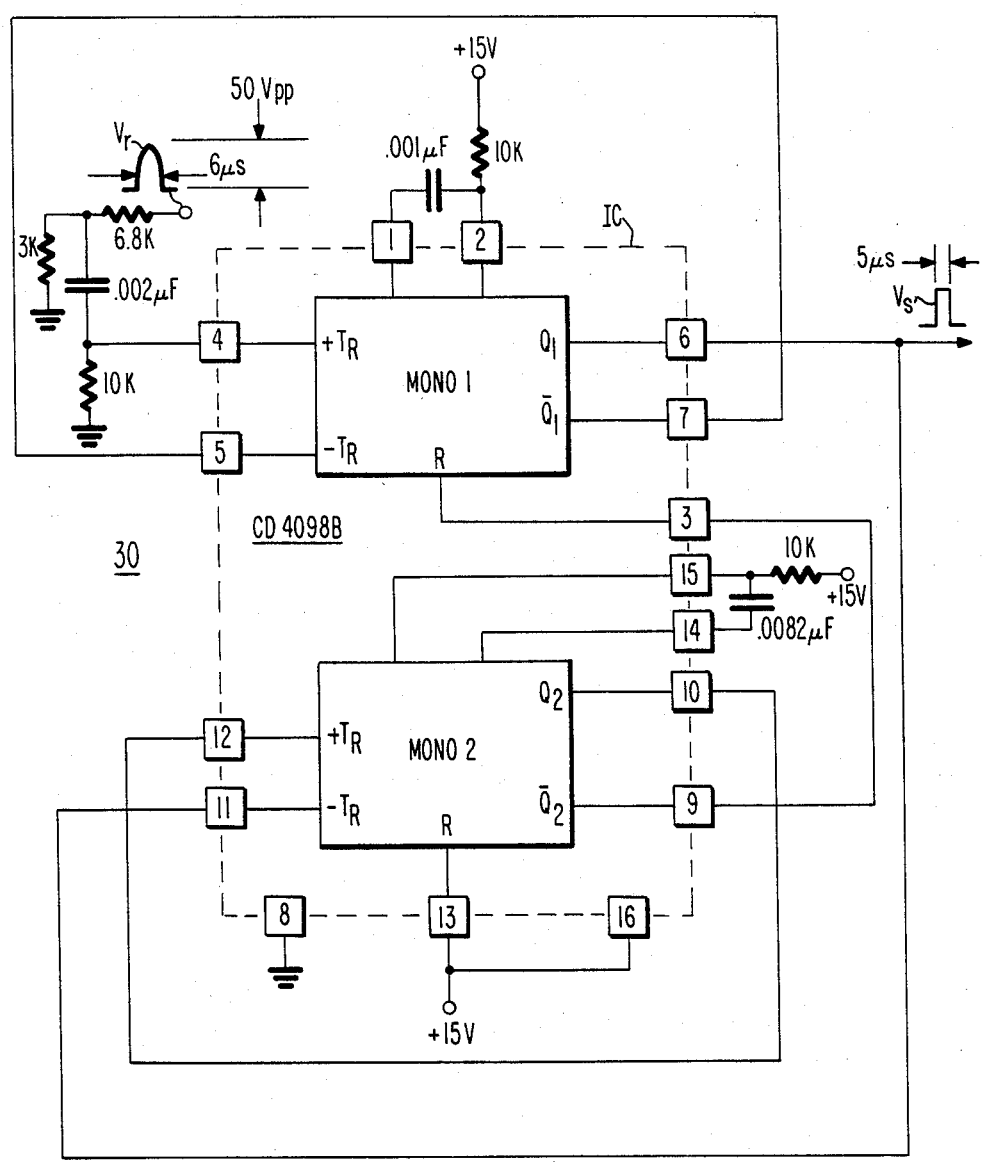
FIG. 3 illustrates a portion of the power supply control circuit of FIG. 1, including a different embodiment of the generator of the synchronizing control signals.

FIG. 3 illustrates another embodiment of pulse conditioning circuit 30 using a single integrated circuit such as a dual one-shot, CD4098, manufactured by the Solid State Division of RCA Corporation, Somerville, NJ. In the pulse conditioning circuit of FIG. 3, the retrace pulse voltage $V_r$ of FIG. 1 is AC coupled to pin 4 of the IC. Pin 4 provides the function of positive edge triggering +TR of the first monostable section within the IC. The $Q_1$ output pin 6 goes high, producing the leading edge of the regulator sync pulse $V_s$ of FIG. 1. The duration of the high output on pin 6 and the duration of the regulator sync pulse $V_s$, is determined by the time constant of the RC network coupled to pins 1 and 2. In FIG. 3 the RC time constant is chosen to produce, illustratively, a five microsecond wide positive pulse $V_s$.

At the end of the five microsecond wide pulse, the negative going edge of the voltage at pin 6 is applied to the −TR input pin 11 of the second monostable section within the IC. Upon arrival of the negative going edge of the voltage of $V_s$ at pin 11, the $\overline{Q}_2$ output pin 9 is coupled to the reset pin 3 of the first monostable. When the reset input of the first monostable is switched to the low state by the $\overline{Q}_2$ output of the second monostable, the $Q_1$ output of the first monostable is disabled from going high for a period equivalent to the period Δt of FIG. 2d.

The period Δt is determined by the time constant associated with the RC network coupled to pins 14 and 15 of the second monostable and is of, illustratively, 40 microsecond duration. This 40 microsecond duration is sufficiently long to disable the $Q_1$ output from going high during the occurrence of every other retrace pulse voltage $V_r$ being applied to pin 4 when horizontal deflection circuit 40 is being operated at the 2H rate. The 40 microsecond duration is short enough, however, to permit every 1H mode retrace pulse $V_r$ that is applied to pin 4 to trigger the first monostable and develop the pulse voltage $V_s$ at output pin 6. The pulse conditioning circuit of FIG. 3, therefore, enables power supply 20 to operate at the unchanged 1H frequency even when deflection circuit 40 is operated at the 2H frequency.

What is claimed is:

1. In a display system having a multiple rate scanning system, a synchronized switching power supply, comprising:

a deflection circuit for producing scanning current in a deflection winding and capable of being operated at either one of two selectable scanning frequencies;

means for generating a synchronizing signal synchronously related to said scanning circuit;

means responsive to said synchronizing signal for generating a control signal that is synchronously related to said scanning current and of a frequency that is unchanged when said deflection circuit is operated at either of said two scanning frequencies; and a switching power supply for developing a supply voltage for said display system and which is responsive to said control signal for producing switching operation of said power supply at said unchanged frequency in synchronism with said scanning current.

2. A switching power supply according to claim 1 wherein said synchronizing signal comprises a deflection retrace indicative pulse and wherein said switching power supply comprises a source of input voltage, a power transformer and a switching transistor coupled said input voltage source and to a first winding of said power transformer for developing said supply voltage from the voltage generated across a second winding of said power transformer, said control signal producing the turn-off of said switching transistor during a deflection retrace interval.

3. A switching power supply according to claim 1 wherein said control signal generating means produces a control signal repeating at the lower of the two scanning frequencies when said deflection circuit is operated at the higher of the two scanning frequencies.

4. A switching power supply according to claim 3 wherein said control signal generating means comprises a gate to which said synchronizing signal is applied and means for disabling said gate for a first interval greater than that of the duration of one cycle of the higher of the two scanning frequencies and for less than that of the lower of the two scanning frequencies.

5. A switching power supply according to claim 4 wherein said gate disabling means comprises a monostable having an unstable state of duration equal to that of said first interval.

6. A switching power supply according to claim 1 wherein the second of said two scanning frequencies is a multiple of the first of the two scanning freqencies and wherein said control signal generating means comprises means for deleting in a repetitive manner a number of cycles of said synchronizing signal when said deflection circuit is operated at said second scanning frequency for producing control signal that is repetitive at said first scanning frequency.

7. A switching power supply according to claim 6 wherein said cycle deleting means comprises a dual one-shot.

8. A switching power supply according to claim 6 wherein said synchronizing signal comprises a deflection retrace indicative pulse and wherein said switching power supply comprises a source of input voltage, a power transformer and a switching transistor coupled said input voltage source and to a first winding of said power transformer for developing said supply voltage from the voltage generated across a second winding of said power transformer, said control signal producing the turn-off of said switching transistor during a deflection retrace interval.

* * * * *